United States Patent [19]

Miyazaki

[11] Patent Number: 4,929,824

[45] Date of Patent: May 29, 1990

[54] LIGHT METERING DEVICE WITH DETECTOR MATRIX AND MEAN VALUE DETECTION

[75] Inventor: Takao Miyazaki, Tokyo, Japan

[73] Assignee: Fuji Photo Film Co., Ltd., Kanagawa, Japan

[21] Appl. No.: 315,113

[22] Filed: Feb. 24, 1989

[30] Foreign Application Priority Data

Feb. 26, 1988 [JP] Japan ................................ 63-43453
Feb. 26, 1988 [JP] Japan ................................ 63-43454
Mar. 11, 1988 [JP] Japan ................................ 63-57965

[51] Int. Cl.$^5$ ............................................ H01J 40/14
[52] U.S. Cl. ................................ 364/525; 250/214 P; 250/208.1; 250/208.3; 356/222; 354/432
[58] Field of Search .................. 250/208, 209, 214 R, 250/214 P; 356/218, 222; 354/432

[56] References Cited

U.S. PATENT DOCUMENTS 4,445,778 5/1984 Nakauchi ............................ 356/222
4,476,383 10/1984 Fukuhara et al. ................ 250/214 P Primary Examiner—David C. Nelms

[57] ABSTRACT

A light metering device includes a light detecting number having a plurality of light detecting elements arranged in a matrix for detecting brightness of smaller divisions into which a whole image field is divided, respectively, to define a plurality of light metering areas different in area in an image field so as to contain a smaller light metering area within a larger light metering area, and a calculating member for obtaining a mean brightness value of each light metering area by calculating an arithmetic mean value of the outputs from the light detecting elements defining each light metering area. The difference of mean brightness values of two adjacent light metering areas is compared with a predetermined critical mean brightness value to determine that lighting condition under which a subject exists is ordinary or unusual.

9 Claims, 8 Drawing Sheets

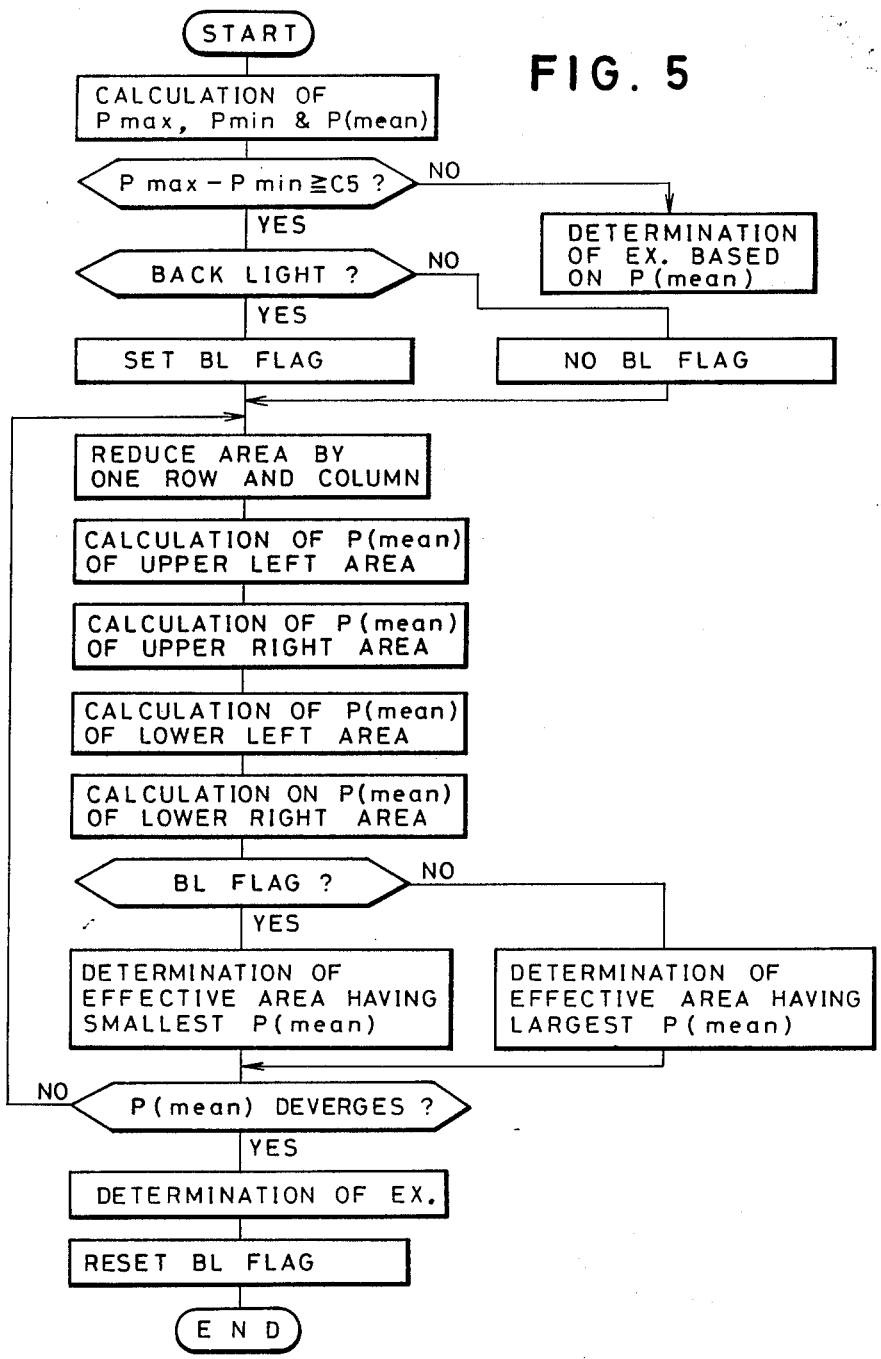

LIGHT METERING DEVICE WITH DETECTOR MATRIX AND MEAN VALUE DETECTION

BACKGROUND OF THE INVENTION

The present invention relates to a light metering device used in cameras such as electronic still cameras, electronic video cameras and conventional film cameras.

Generally, lighting conditions under which a subject has a brightness considerably lower than its background are referred to as a rear-lighting or backlighting condition that is one of a number of undesirable conditions for proper exposure. Detecting backlight conditions is carried out by comparing the brightness of a subject located at the center area of an image field allocated for light metering with the brightness of the background included in the image field. This is well known in the art as a spot metering system.

Meanwhile, in recent years, it has become widely popular to equip photographic cameras with improved light metering devices in order to effect proper exposures even under backlight conditions. One example of such light metering devices is disclosed in, for example, Japanese Patent Publication No. 59-33,889. The light metering device includes a light metering system having a number of photo-electric elements arranged in a plane on which an image of a subject is focused. The light metering system compares the integrated brightness value of the subject detected in a spot metering manner with that of the whole image field to determine an existing lighting condition. If the difference of integrated brightness value of a subject relative to the background or the whole image field is larger than a predetermined value, the integrated brightness value of the spot metered subject is automatically selected to determine exposure. Otherwise, if the difference of integrated brightness value of the subject relative to the background or the whole image field is smaller than the predetermined value, the integrated brightness value of the whole image field is automatically selected to determine exposure.

Another example of such light metering devices can be found in, for example, Japanese Unexamined Patent Publication No. 62-96,824. in the light metering device, outputs representing brightness for several light metering areas within the whole image field are compared with a predetermined certain value. In this manner, a proper exposure can be determined even under backlight conditions by excluding outputs beyond the predetermined certain value.

In any light metering device mentioned above, it is quite difficult to place a principal subject at the light metering center area of the image field because of possibly moving the subject. It is also difficult to manually select a spot metering area in the image field on a principal subject. These difficulties result in an inaccurate light metering.

OBJECT OF THE INVENTION

It is, therefore, an object of the present invention to provide a light metering device in which lighting conditions under which a subject exist can be automatically determined even when the subject is at any location in the image field, thereby automatically accurately providing brightness data necessary for proper exposure.

SUMMARY OF THE INVENTION

According to a preferred embodiment of the present invention, light metering device comprises light detecting means consisting of a plurality of light detecting elements arranged in a matrix for detecting brightness of smaller divisions into which a whole image field is divided, respectively, to define a plurality of light metering areas different in area in an image field so as to contain a smaller light metering area within a larger light metering area, and calculating means for obtaining a mean brightness value of each light metering area by calculating an arithmetic mean value of outputs from the light detecting elements defining each light metering area. The difference of mean brightness values of each adjacent two light metering areas is compared with a predetermined critical mean brightness value to determine if lighting condition under which a subject exists is ordinary or unusual.

When the mean brightness value of a larger light metering area is larger than that of the smaller light metering area by a predetermined or preselected certain value, it is determined that a subject is under a backlight condition, and when the mean brightness value of a smaller light metering area is larger than that of the larger light metering area by a predetermined or preselected certain value, it is determined that the subject is under a spot-light condition. Otherwise, when the difference between the mean brightness values of the larger and smaller light metering areas is between the predetermined certain values, it is determined that the subject is under an ordinary lighting condition. Lighting conditions; normal lighting conditions or unusual lighting conditions including backlight and spot-light lighting conditions, under which a subject exist can be automatically determined even when the subject is at any location in the image field unless otherwise at extremely marginal locations, the light metering device automatically accurately provides brightness data necessary for proper exposure.

According to another preferred embodiment of the present invention, a light metering device comprises; a plurality of light detecting elements arranged in a matrix to detect brightness of smaller divisions into which a whole image field is divided, respectively; means for defining a reference standard light metering area by selectively driving the light detecting elements contained in a corresponding rectangular area, defining a rectangular light metering area reduced in size depending from the reference standard light metering area, shifting the reduced light metering area in four ways so as to coincide one corner of the reduced light metering area with a corresponding corner of the reference standard light metering area one after another to detect a mean brightness value of the reduced light metering area shifted to each the corresponding corner of the reference standard light metering area, selecting one reduced light metering area having an extreme mean brightness value among the four-way shifted reduced light metering areas to determine it as another reference standard light metering area and defining another reduced rectangular light metering area depending from the another reduced light metering area; means for detecting a maximum brightness value of the respective reference standard light metering area; and means for comparing the difference of the maximum brightness values of each reference standard light metering areas and a maximum brightness value of the whole maximum light metering area corresponding the whole image field with a determined or preselected value.

An exposure is determined based on the mean brightness value of the another reference standard light metering area when the difference between maximum brightness values becomes larger and converges the predetermined value. Backlight condition as an unusual lighting condition under which a subject exist can be automatically determined by excluding brightness data for a part of the image field which has brightness considerably higher than that of the subject when the subject is at any location in the image field, the light metering device automatically accurately provides brightness data necessary for proper exposure.

According to still another preferred embodiment of the present invention, a light metering device comprises a plurality of light detecting elements arranged in a matrix to detect a brightness of smaller divisions into which a whole image field is divided, respectively; means for defining a reference standard light metering area by selectively driving the light detecting elements contained in a corresponding rectangular area, defining a rectangular light metering area reduced in size depending from the reference standard light metering area, shifting the reduced light metering area in four ways so as to coincide one corner of the reduced light metering area with a corresponding corner of the reference standard light metering area one after another to detect a mean brightness value of the reduced light metering area shifted to each the corresponding corner of the reference standard light metering area, selecting one reduced light metering area having an extreme mean brightness value among the four-way shifted reduced light metering areas to determine it as another reference standard light metering area and defining another reduced rectangular light metering area depending from the another reduced light metering area; means for detecting a mean brightness value of the respective reference standard light metering area; and means for comparing the difference of the mean brightness values of each two adjacent reference standard light metering areas with a determined or preselected value.

An exposure is determined based on the mean brightness value of the another reference standard light metering area when the difference between the mean brightness values of the adjacent reference standard light metering areas converges the predetermined value. Unusual lighting condition, such as a backlight or spotlight lighting condition, under which a subject exist can be automatically determined even when the subject is at any location in the image field, the light metering device automatically accurately provides brightness data necessary for proper exposure.

BRIEF DESCRIPTION OF THE DRAWINGS

FIG. 5 is a flow chart illustrating a sequence for a central processing unit which controls operation of the light metering device of the second preferred embodiment of the present invention;

DETAILED DESCRIPTION OF THE INVENTION

Figure 1:
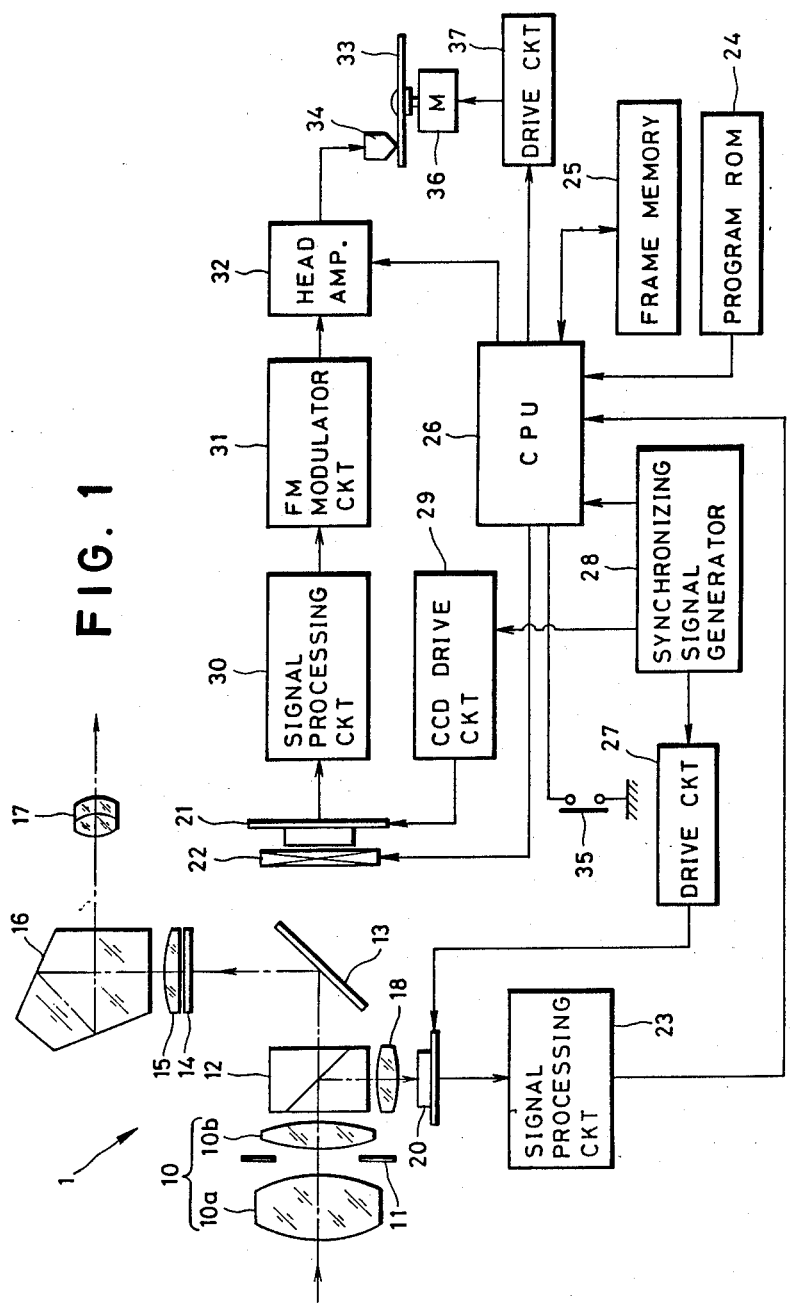
FIG. 1 is a block diagram illustrating an electronic still camera system in which the present invention is embodied.

Referring now to FIG. 1, a single lens reflex type electronic still camera 1 is shown having a taking lens system 10 comprising two lens groups; front or first 10a and rear or second 10b. A diaphragm 11 of the type operating quickly is disposed between the first and second lens groups 10a and 10b. A beam splitter 12 is located right behind the second lens group 10b and a quick return reflective mirror 13 is located behind the beam splitter 12. Above the quick return reflective mirror 13, a focusing screen 14 is fixedly provided substantially at a right angle. An image focused on the focusing screen 14 is viewed through a finder system comprising a condenser lens 15, pentagonal prism 16 and eye piece 17.

Figure 2:
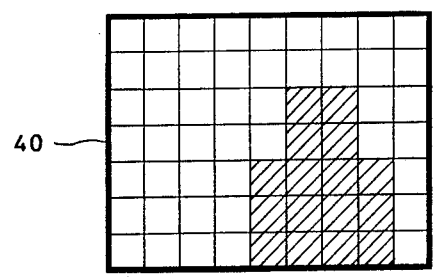
FIGS. 2A, 2B and 2C are illustrations showing various light metering areas for explaining operation of the light metering device according to a first preferred embodiment of the present invention.
Figure 2:
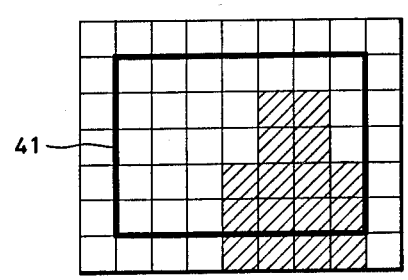
Figure 2:
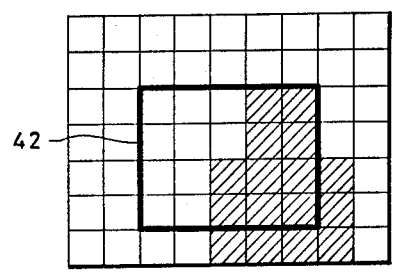

A photo-diode array 20 working as a light detector is disposed below the beam splitter 12 to receive light rays focused thereon by means of a focusing lens 18. The photo-diode array 20, which is a charge coupled device (CCD), has 63 photo-diode elements arranged in a seven row-nine column matrix forming a primary reference standard light metering area corresponding to and including the whole image field 40 such as shown in FIG. 2A. The taking lens system 10 focuses an image of a subject on the surface of the photo-diode array 20. A shutter 22, which is preferably a focal plane shutter, is disposed behind the quick return reflective mirror 13 and is positioned in a focal plane on which the taking lens system 10 focuses an image. An electronic imaging device 21 comprising a charge coupled device (CCD) is disposed right behind the shutter 22.

A signal processing circuit 23 is, on one hand, connected to the photo-diode array 20 and, on the other hand, to a central processing unit (CPU) 26 operating various operative elements with a sequential programmed operation stored in a program ROM 24. A frame memory 25 is connected to and controlled by the CPU 26 to store therein serial data of outputs transferred to the CPU 26 from the photo-diode array 20 through the signal processing circuit 23 in address order. The output from the photo-diode array 20 represents the light intensity of each small part of an image of the subject focused on the surface of the photo-diode array 20. It is understood that the image is notionally divided into a number of small parts by and correspondingly to the photo-diode elements of the photo-diode array 20. The CPU 26 controls the shutter 22 and diaphragm 11 to open and close according to a result obtained based on the data of light intensity so as to expose the CCD imaging device 21 to the incident light. A shutter release switch 35 is connected to the CPU 26 to initiate the programmed operation of the electronic still camera 1.

A signal processing circuit 30 is connected, on one hand, to the CCD imaging device 21 and, on the other hand, to a magnetic recording head 34 through an FM modulator circuit 31 and a magnetic head drive amplifier 32 connected to the CPU 26. The magnetic recording head 34 records video signals on a magnetic recording medium such as a still picture floppy 33. The still picture floppy 33 is driven at a constant speed of rotation by a known floppy drive having a motor 36 which is controlled by a drive circuit 37 connected to the CPU 26.

The photo-diode array 20 and CCD imaging device 21 are driven by drive circuits 27 and 29, respectively, connected to a synchronizing signal generator 28 to transfer image signals with synchronizing signals generated by the synchronizing signal generator 28. The synchronizing signal generator 28 also generates master clock pulses for operating the CPU 26.

In the operation of the electronic still camera 1 constructed as above, when powering the electronic still camera 1 after loading the still picture floppy 33 into the electronic still camera 1, the synchronizing signal generator 28 generates a series of master clock pulses and sends them to the CPU 26 and drive circuits 27 and 29 for the photo-diode array 20 and CCD imaging device 21, respectively. The CPU 26 provides the drive circuit 37 with drive signals to rotate the motor 36, driving the still picture floppy 33. The still picture floppy 33 will reach a constant speed of rotation of 60 revolutions per second in approximately "60" ms after the start of rotation.

Aiming the optical axis of the taking lens system 10 at a subject, light rays from the image field or scene enter into the taking lens system 10 and are divided into two parts by the beam splitter 12; one directly directed toward the quick return reflective mirror 13 and the other reflected by the interface of the beam splitter 12 and directed toward the photo-diode array 20. The taking lens system 10 forms an image of the subject which passes through the beam splitter 12 and then is reflected at a right angle and directed toward the focusing screen 14. The subject image on the focusing screen 14 is viewed through the finder system and focused on the focusing screen 14 by adjusting the taking lens system 10. When the taking lens system 10 focuses the image of the subject on the focusing screen 14, the focusing lens 18 focuses, in cooperation with the taking lens system 10, the subject image on the surface of the photo-diode array 20.

The photo-diode array 20 transfers the focused subject image into brightness signals which are sent to the CPU 26 after being amplified and converted into a digital form in the signal processing circuit 23. The CPU 26 controls the frame memory 25 to temporarily store the brightness signals therein according to the programmed sequence of operation in the program ROM 24.

FIG. 2A illustrates the primary reference standard light metering area defined and measured by the photo-diode array 20 including all of the photo-diode elements and therefore all data of brightness stored in the frame memory 25. Data of the primary reference standard light metering area 40 of the image field can be recorded as magnetic signals in single or double tracks of the still picture floppy 33 allocated for one frame. FIG. 2B illustrates a secondary light metering area 41 smaller than the first light metering area 40 shown in FIG. 2A, and FIG. 2C illustrates a third light metering area 42 smaller than the second light metering area 41 shown in FIG. 2B. The secondary and third light metering areas can be defined by excluding the upper and lower lines and first and last columns of the photo-diode elements from the primary and secondary light metering areas, respectively.

Figure 3:
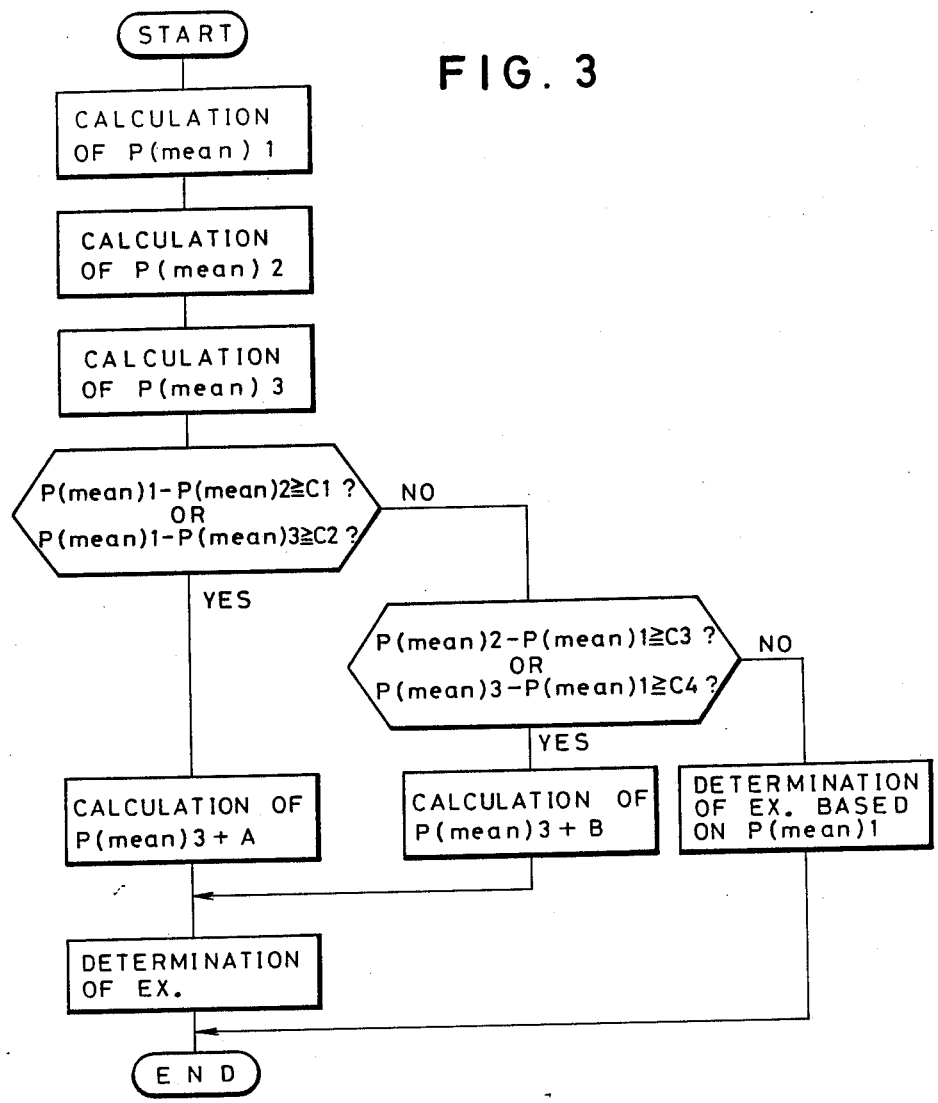
FIG. 3 is a flow chart illustrating a sequence for a central processing unit which controls operation of the light metering device of the first preferred embodiment of the present invention.

Light metering in the electronic still camera 1 shown in FIG. 1 is best understood with reference to a flow chart illustration the programmed sequence of operation for the CPU 26 shown in FIG. 3. As shown, the CPU 26 calculates a mean brightness $P_{mean}1$ of the primary light metering area 40 by dividing the sum of the values of brightness of all divisions of the primary light metering area 40 by the number of the photo-diode elements of the photo-diode array 20. The CPU 26 calculates a mean brightness $P_{mean}2$ of the secondary light metering area 41 by dividing the sum of the values of brightness of smaller divisions of the secondary light metering area 41 by the numbr of the photo-diode elements of the photo-diode array 20 included in an area corresponding to the secondary light metering area 41. In a same way, a mean brightness $P_{mean}3$ of the third light metering area 42 is calculated.

If the subject is back-light and is not located extremely close to the edge of light metering area such as a part defined by the boundaries of the primary and secondary light metering area 40 and 41, the difference of mean brightness between the primary and secondary light metering areas ($P_{means}1 - P_{mean}2$) is certainly equal to or larger than a certain value C1, for example "0.18". However, if a space the subject is occupying in the whole image field is small, the difference of mean brightness ($P_{mean}1 - P_{mean}2$) is possibly considerably small. For this reason, in the present invention, the third light metering area 42 is provided to accurately determine whether the subject is back-lit. That is, a backlight condition is determined if the difference of mean brightness ($P_{mean}1 - P_{mean}2$) is equal to or larger than the certain value C1 and the difference of mean brightness between the first and third light metering areas ($P_{means}1 - P_{mean}3$) is equal to or larger than a certain value C2, for example "0.49".

For example, if assuming that the brightness value of each smaller division is aEV for the background and bEV for the subject, the mean brightness value $P_{mean}$ in exposure value (EV) is given as follows:

$$P_{mean}1 = (47a + 16b)/63$$

$$P_{mean}2 = (23a + 12b)/35$$

$$P_{mean}3 = (10a + 10b)/20$$

Hence, $$P_{mean}1 - P_{mean}2 = 4/45 \times (a - b)$$

$$P_{mean}1 - P_{mean}3 = 31/126 \times (a - b)$$

If "backlight" is assumed to be a condition that the difference (a−b) of brightness value in exposure value (EV) is not smaller than 2 EV, the above expressions can be rewritten as follows:

$$P_{mean}1 - P_{mean}2 \geq 0.18$$

$$P_{mean}1 - P_{mean}3 \geq 0.49$$

$$P_{mean}2 - P_{mean}3 \geq 0.31$$

When either one of the expressions, $P_{mean}1 - P_{mean}2 \geq C1$ and $P_{mean}1 - P_{mean}3 \geq C2$ is satisfied, it is determined that the subject is under a backlight condition. If in fact the subject is determined to be backlit, after the calculation of $P_{mean}3$ plus a predetermined correction exposure value A for backlight condition, for example $-0.5$ EV, an exposure E is determined based on the corrected value $(P_{mean}3 + A)$. Taking a picture with the exposure E provides an image including the subject and background well balanced in brightness.

On the other hand, if both of the expressions, namely $P_{mean}1 - P_{mean}2 \geq C1$ and $P_{mean}1 - P_{mean}3 \geq C2$ are not satisfied, the decision is made whether the further expressions, $P_{mean}2 - P_{mean}1 \geq C3$ and $P_{mean}3 - P_{mean}1 \geq C4$ are satisfied or not. If these expressions are both satisfied, the subject is determined to be under a spot-light illumination. In this event, after the calculation of $P_{mean}3$ plus a predetermined correction exposure value B for a spot-light illumination condition, for example $+0.5$ EV, an exposure E is determined based on the corrected value $(P_{mean}3 + A)$. Otherwise, the no decision indicates that there is no difference between the primary to third light metering areas 40 to 42. In this event, the image field is determined to be under a normal illumination and an exposure E is determined based on the value $P_{mean}1$.

The exposure E is stored by maintaining the shutter release button depressed in a half to actuate an automatic exposure lock mechanism (of which the construction and operation is well known as an AE lock mechanism to those skilled in the art and therefore need not be illustrated and described herein). Thereafter, framing an image is made through the view finder system and the shutter release button is fully depressed. The quick return mirror 13 turns up quickly simultaneously with turning-on of the release switch 35. Immediately after this, the shutter 22 is opened and closed to black out the view finder system for a time determined based on the exposure E. As soon as the the shutter 22 is closed, the quick return mirror 13 returns to make the view finder system available. With this sequential operation, a properly controlled amount of light reaches the CCD imaging device 21 to form thereon an optical image. As was previously described, the optical image is transformed into video signals by the CCD imaging device 21 and sent to the head amplifier 32 through the signal processing circuit 30 and the FM modulator 31. The CPU 26 controls the head amplifier 32 to drive the magnetic head 34 to momentarily record the video signals sent thereto from the CCD imaging device 21 on the still picture floppy 33.

Referring to FIGS. 4A through 4L and 5 illustrating another preferred embodiment of the present invention for use with the electronic still camera 1 shown in FIG. 1, a primary light metering area 50 corresponding to the whole image field (which is referred to as a primary standard light metering area) measured by the photo-diode array 20 including all photo-diode elements of the photo-diode array 20 and therefore all data of brightness stored in the frame memory 25. The primary standard light metering area 50 can be recorded as magnetic signals in single or double tracks of the still picture floppy 33 for one frame.

Firstly, the CPU 26 reads from the photo-diode array 20 maximum and minimum values of brightness $P_{max}$ and $P_{min}$ in exposure value (EV) among divisions into which the primary standard light metering area 50 is divided into smaller divisions by the photo-diode elements of the photo-diode array 20 which are arranged in a matrix.

The first step is to decide whether the difference between the maximum and minimum values $(P_{max} - P_{min})$ is smaller than a certain value C5, for example 2EV. If the answer to the first decision is no, the CPU 26 calculates a mean brightness $P_{mean}1$ of the primary standard light metering area 50 by dividing the sum of the values of brightness of all divisions of the primary standard light metering area 50 by the number of the photo-diode elements of the photo-diode array 20. An exposure E is calculated based on the mean brightness $P_{mean}1$. Otherwise, the yes decision indicates that the difference of brightness among the divisions of the primary standard light metering area 50 is large. In this event, the image field is assumed to be either under a backlight illumination or under a spot-light illumination. Therefore, a second decision is made: is "the image field under a backlight illumination?" For this decision, a comparison is made between mean brightness values $P_{mean}1$ and $P_{mean}2$ of the primary standard light metering area 50 and a smaller light metering area 51, used as a first reference light metering area, reduced in size by excluding the outermost lines and columns of the photo-diode elements of the photo-diode array 20 shown by a shaded area in FIG. 4A, respectively. The primary standard light metering area 50 is determined to be under a backlight illumination if the mean brightness $P_{mean}1$ of the primary standard light metering area 50 is larger than the mean brightness $P_{mean}2$ of the second image field 51 or to be under a spot-light illumination if the mean brightness $P_{mean}1$ of the primary standard light metering area 50 is smaller than the mean brightness $P_{mean}2$ of the first reference light metering area 51. The CPU 29 sets in its register a backlight flag (BL FLAG) indicating that the image field is back-lit if the answer is yes, or no backlight flag is set indicating that the image field is not back-lit but illuminated with a spot light if the answer is no.

Figure 4A:
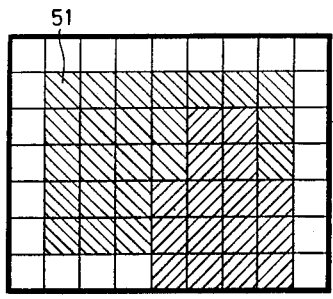
FIGS. 4A, 4B, 4C, 4D, 4E, 4G, 4H, 4I, 4J, 4K and 4L are illustrations showing various light metering areas for explaining operation of the light metering device according to a second preferred embodiment of the present invention.
Figure 4B:
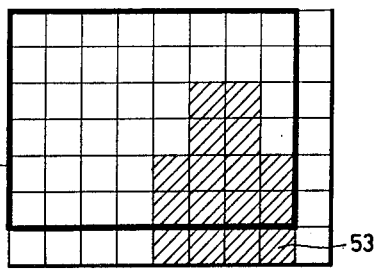
Figure 4C:
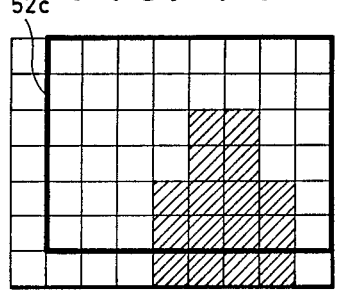
Figure 4D:
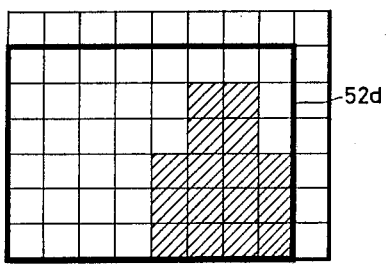
Figure 4E:
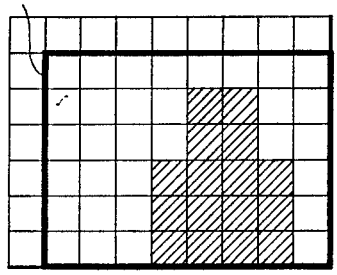

Then, the CPU 26 establishes another light metering area (which is referred to as a second standard light metering area) by excluding the highest or lowest line of photo-diode elements and the first or last column of photo-diode elements from the photo-diode array 20 and calculates a mean brightness $P_{mean}$ of the second standard light metering area. That is, the CPU 26 calculates the mean brightness $P_{mean}B$ for a second reference light metering area 52b which is identical in area to the second standard light metering area but shifted in location upper left as shown in FIG. 4B; the means brightness $P_{mean}C$ for a second reference light metering area 52c located upper right as shown in FIG. 4C; the mean brightness $P_{mean}D$ for a second reference light metering area 52d located lower left as shown in FIG. 4D; and the mean brightness $P_{mean}E$ for a second reference light metering area 52e located lower right as shown in FIG. 4E, in this order. If assuming the brightness of background of the second light metering area to be aEV and the brightness of a subject area 53 shown by a shaded area in FIGS. 4A through 4F to be bEV, the mean brightness is expressed as follows:

$$P_{mean}B = (36a + 12b)/48$$

$$P_{mean}C = (36a + 12b)/48$$

$$P_{mean}D = (36a + 12b)/48$$

$$P_{mean}E = (36a + 12b)/48$$

When the backlight flag is set, this indicates that the brightness "a" is larger than the brightness "b" and therefore the following relation is satisfied:

$$P_{mean}B = P_{mean}C > P_{mean}D = P_{mean}E$$

In this event, the CPU 26 selectively specifies one of the second reference light metering areas having a minimum brightness. If there are two or more second reference light metering areas having a minimum brightness, a second reference light metering area located lower is specified. Further, if the two lower second reference light metering areas (the third light metering areas 52d and 52e in this embodiment) have a same mean brightness ($P_{mean}D = P_{mean}E$), selectively specified is the lower right second reference light metering area, namely the second reference light metering area 52e in this embodiment.

Figure 4F:
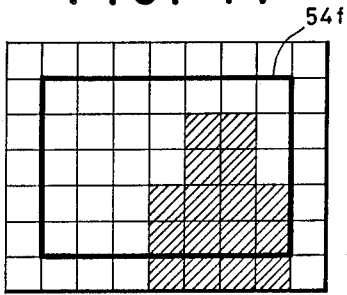
Figure 4:
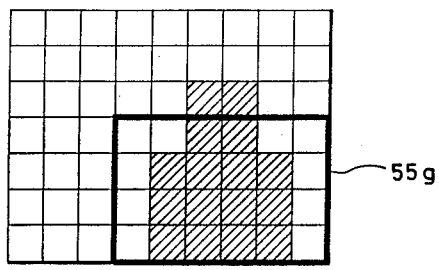
Figure 4:
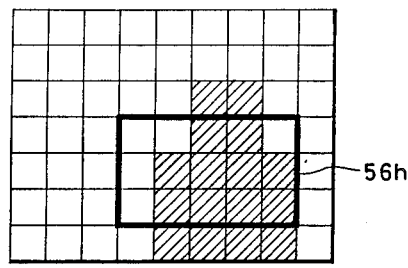
Figure 4:
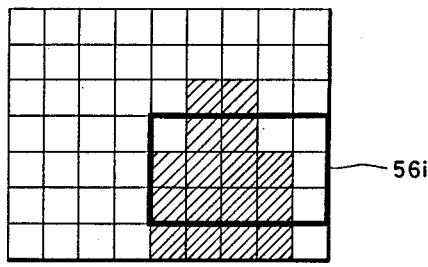
Figure 4:
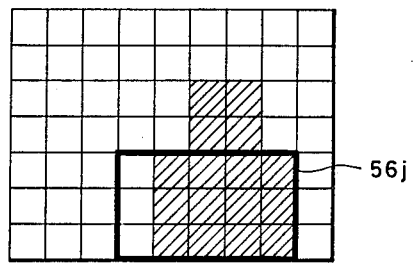
Figure 4:
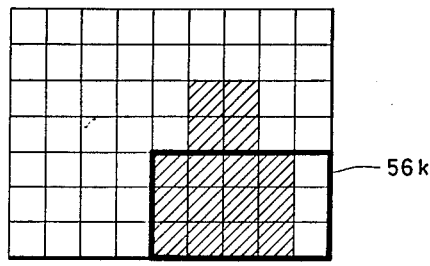
Figure 4:
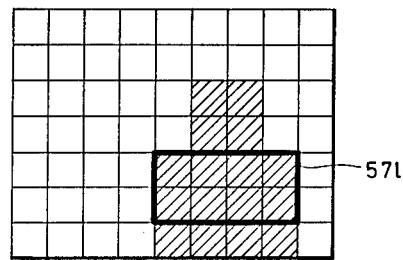

The CPU 26 further establishes another smaller light metering area (which is referred to as a third standard light metering area) 54f as shown in FIG. 4F by narrowing the third light metering area 52e selected in the above manner by excluding the lowest line and the last column of photo-diode elements of the photo-diode array 20. In the same manner as described for the second reference light metering area, a third reference light metering area depending from the third standard light metering area 54f is shifted and located upper left, upper right, lower left and lower right, in the third standard light metering area 54f in this order, and the mean brightness is calculated for the respective third reference light metering area at each location. One, for example the third reference light metering area 55g as shown in FIG. 4G, of the four possible third reference light metering areas is selected by comparing the mean brightness and narrowed by further excluding the lowest row and the last column of photo-diode elements of the photo-diode array 20. By repeating the above procedure, a narrowed smaller light metering area is established depending from the selected third reference light metering area 55g to form a fourth standard light metering area. Thereafter, the fourth standard light metering area is shifted and located upper left, upper right, lower left and lower right, in the third standard light metering area 54f in this order, to form four fourth reference light metering areas 56h, 56i, 56j and 56k as shown in FIGS. 4H, 4I, 4J and 4K, respectively, and the mean brightness is calculated for the respective fourth reference light metering area at each location.

The CPU 26 calculates a mean brightness of the respective fourth reference light metering area shifted to the four locations; namely $P_{mean}H$ for the refernce light metering area 56h located lower right as shown in FIG. 4H, $P_{mean}I$ for the reference light metering area 56i located lower right as shown in FIG. 4I, $P_{mean}J$ for the reference light metering area 56j located lower right as shown in FIG. 4J, $P_{mean}K$ for the reference light metering area 56k located lower right as shown in FIG. 4K. The mean brightness is expressed as follows:

$$P_{mean}H = (5a + 10b)/15$$

$$P_{mean}I = (5a + 10b)/15$$

$$P_{mean}J = (5a + 10b)/15$$

$$P_{mean}K = (5a + 10b)/15$$

Therefore the following relation is satisfied:

$$P_{mean}H = P_{mean}I > P_{mean}J = P_{mean}K$$

As a result, the reference light metering area 56k is effectively selected. In the same manner a described above, a latest standard light metering area 57 is established depending from the selected reference light metering area 56k as shown in FIG. 4L. The mean brightness of the latest standard light metering area 57 is given as follows:

$$P_{mean}L = 8b/8 = b$$

As apparent, the mean brightness of the latest standard light metering area 57 becoms or converges equal to the value "b" in exposure value.

An effective proper exposure E is determined based on the converged mean brightness of the value "b". At this time, the backlight flag disappears or is reset for another light metering.

It is to be understood that the value "b" precisely represents the mean brightness of a subject and, however, indicates that the lighting condition of the subject is quite similar to a spot-lighting in the image field. Accordingly, the subject can be imaged with a good reproductivity but the background often loses its details. For this reason, it is preferred to take a mean brightness, for example the mean brightness $P_{mean}B$ of the upper left second reference image field 52b. In this case, the effective exposure E is determined based on the value "b" and the mean brightness $P_{mean}B$ weighted, respectively. In such a way, the subject and background can be imaged and balanced in reproductivity.

If no backlight flag is set, a reference light measuring image area having a maximum mean brightness is selected for establishing another standard light metering area. Even in the case of setting no backlight flag, an effective proper exposure E can be determined in the same procedure.

Figure 6A:
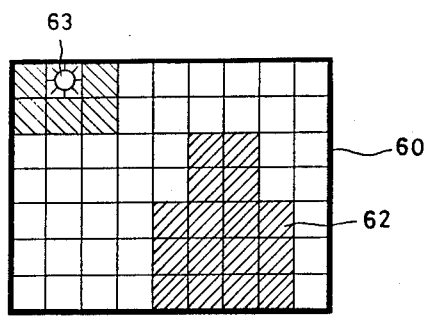
FIGS. 6A, 6B, 6C, 6D and 6E are illustrations showing various light metering areas for explaining operation of the light metering device according to a third preferred embodiment of the present invention.
Figure 7:
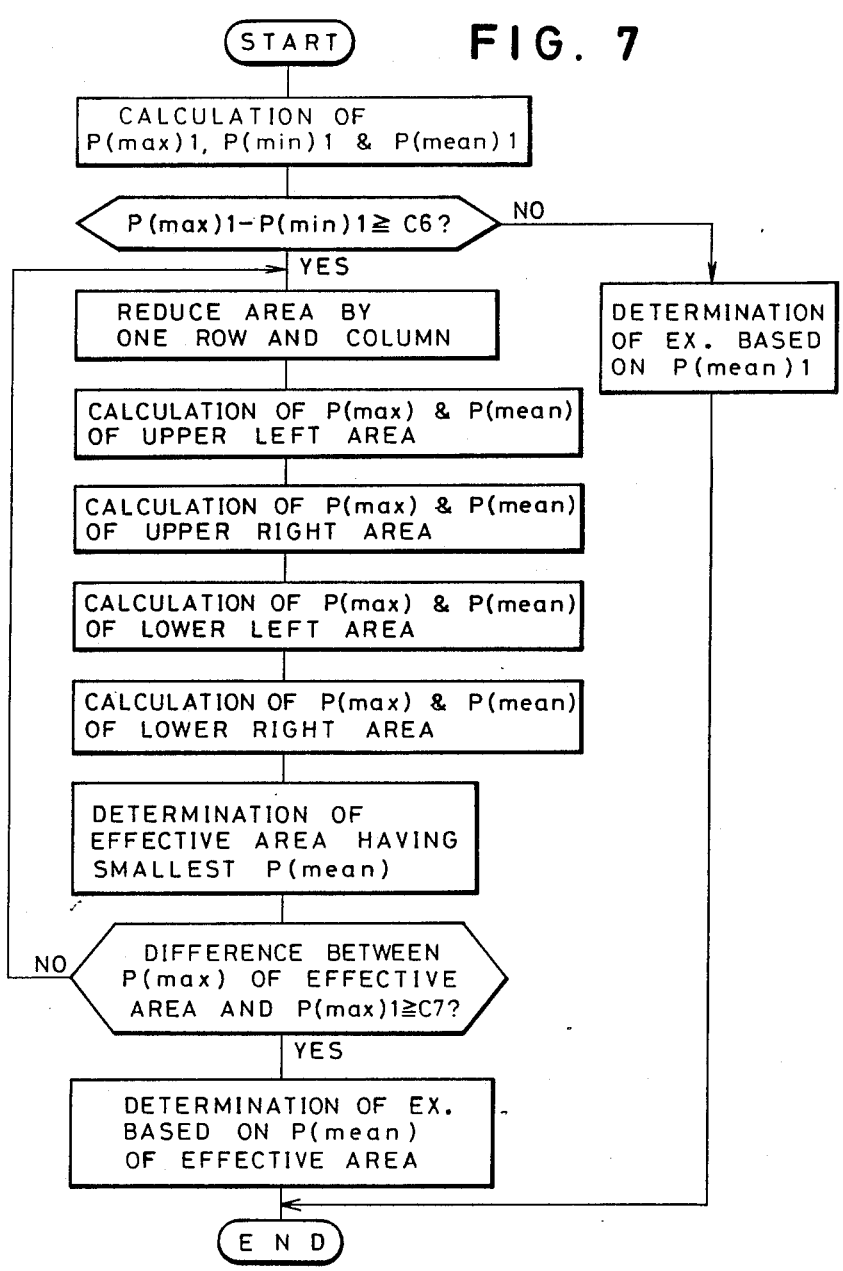
FIG. 7 is a flow chart illustrating a sequence for a central processing unit which controls operation of the light metering device of the third preferred embodiment of the present invention.

Referring to FIGS. 6A through 4E and 7 illustrating still another preferred embodiment of the present invention for use with the electronic still camera 1 shown in FIG. 1, a primary standard light metering area 60 (which is corresponding to the whole image field) is measured by the photo-diode array 20 including all photo-diode elements arranged in a matrix thereof and, therefore, all data of brightness is stored in the frame memory 25. The primary standard light metering area 60 can be recorded as magnetic signals in a single or double track of the still picture floppy 33 allocated for one still picture.

Firstly, the CPU 26 reads from the photo-diode array 20 maximum and minimum values of brightness $P_{max}$ and $P_{min}$ in exposure value (EV) among divisions into which the primary standard light metering area 60 is divided by the photo-diode elements of the photo-diode array 20 which are arranged in a matrix.

The first step is to decide whether the difference between the maximum and minimum values ($P_{max} - P_{min}$) is smaller than a certain value C6, for example 2EV. If the answer to the first decision is no, the CPU 26 calculates a mean brightness $P_{mean}1$ of the primary standard light metering area 60. This is done by dividing the sum of the values of brightness of all divisions of the primary standard light metering area 60 by the number of the photo-diode elements of the photo-diode array 20. An effective exposure E is calculated based on the mean brightness $P_{mean}1$. Otherwise, the yes decision indicates that the difference of brightness among the divisions of the first image field 60 is large. In this event, the whole image field or scene is assumed to be under a backlight illumination.

Figure 6B:
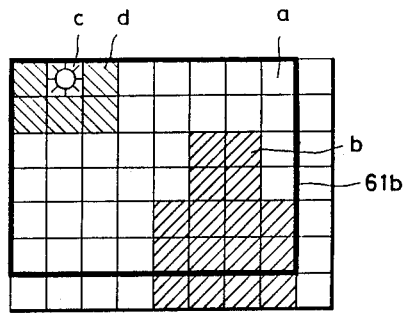
Figure 6C:
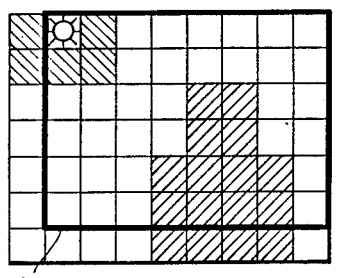
Figure 6D:
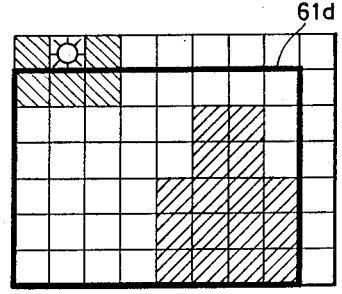
Figure 6E:
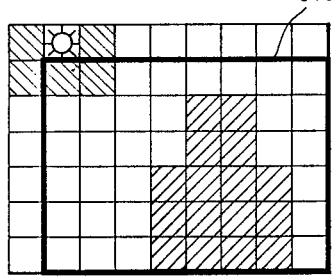

The backlight determination causes the CPU 26 to establish another standard light metering area (which is referred to as a secondary standard light metering area) by excluding the highest or lowest row of photo-diode elements and the first or last column of photo-diode elements from the photo-diode array 20, and calculates a mean brightness $P_{mean}$ of the secondary standard light metering area. That is, the CPU 26 calculates the mean brightness $P_{mean}B$ for a reference light metering area 61b located upper left within the secondary standard light metering area as shown in FIG. 6B; the mean brightness $P_{mean}C$ for a reference light metering area 61c located upper right as shown in FIG. 6C; the mean brightness $P_{mean}D$ for a reference light metering area 61d located lower left as shown in FIG. 6D; and the mean brightness $P_{mean}E$ for a reference light metering area 61e located lower right as shown in FIG. 6E, in this order. Assuming that a brightness in exposure value is aEV for a background of the secondary light metering area, bEV for a subject area 62 which is shaded in FIGS. 6A through 6E, cEV for the sun 63, and dEV for an area surrounding the sun 63, and that the relationship c>d>a>b is satisfied among these brightness values, the mean brightness is expressed as follows:

$$P_{mean}B=(30a+12b+c+5d)/48$$

$$P_{mean}C=(32a+12b+c+3d)/48$$

$$P_{mean}D=(29a+16b+3d)/48$$

$$P_{mean}E=(30a+16b+2d)/48$$

From the above, it is apparent that the relationship, $P_{mean}B > P_{mean}C > P_{mean}D > P_{mean}E$ is satisfied. Therefore, the lower right reference light metering area 61e shown in FIG. 6E is selected to compare the mean brightness $P_{mean}E$ with the maximum brightness $P_{max}1$. Because the maximum brightness $P_{max}E$ and $P_{max}1$ are equal to the values "d" and "c", respectively, the difference of maximum brightness $(P_{max}1-P_{max}E=c-d)$ is larger than a certain value C6, for example 5EV. As a result, the mean brightness $P_{mean}E$ of the lower right reference light metering area 61e is selected to determine an effective exposure E. If the difference of maximum brightness $(P_{max}1-P_{max}E=c-d)$ is smaller than a certain value C7, another narrowed, standard light metering area is established depending upon the reference light metering area 61e and the same procedure as described above is repeated.

It is to be noted that in place of determining an effective exposure E using the mean brightness $P_{mean}E$, an exposure E can be obtained by calculating the following expression:

$$Exposure\ E=P_{min}E+k(P_{max}E-P_{min}E)$$

where k is a constant and takes a value between zero (0) and one (1).

The above described embodiment can be applied to subjects which are illuminated in a spot-light, in the same manner with the same result.

Although the present invention has been fully described by way of the preferred embodiments thereof with reference to the accompanying drawings, it is to be noted that various changes and modifications are apparent to those skilled in the art. Therefore, unless otherwise such changes and modifications depart from the scope of the present invention, they should be construed as included therein.

What is claimed is:

1. A light metering device comprising:
   light detecting means consisting of a plurality of light detecting elements arranged in a matrix for defining a plurality of light metering areas different in area in an image field in such a manner as to contain a smaller light metering area within a larger light metering area;
   calculating means for obtaining a mean brightness value of each light metering area by calculating an arithmetic mean value of outputs from light detecting elements corresponding to each of said plurality of light metering areas; and
   determining means for comparing the difference of mean brightness value between two of each said plurality of light metering areas with a predetermined certain value given for each said two light metering areas to determine lighting conditions under which a subject exists.

2. A light metering device as defined in claim 1, wherein the lighting condition is determined to be normal when each said difference is smaller than said corresponding predetermined certain value, or otherwise unusual when any said difference is equal to or larger than said corresponding predetermined certain value.

3. A light metering device as defined in claim 2, wherein said unusual lighting condition includes a backlight condition and a spot light condition.

4. A light metering device as defined in claim 2, wherein the lighting condition is determined to be a backlight condition when said difference in mean brightness value of the largest light metering area relative to any one of the remaining light metering areas of said plurality of light metering areas is equal to or larger than said predetermined certain value.

5. A light metering device as defined in claim 4, wherein the lighting condition is determined to be a spot-light condition when said difference in mean brightness value of the largest light metering area relative to any one of the remaining light metering areas of said plurality of light metering areas is between two predetermined different values.

6. A light metering device comprising:
   a plurality of light detecting elements arranged in a matrix to detect brightness of smaller divisions into which a whole image field is divided, respectively;
   means for defining a rectangular standard light metering area by selectively driving said light detecting elements contained in a corresponding rectangular area, defining a rectangular reference light metering area reduced in size depending from said standard light metering area, shifting said reduced reference light metering area in four ways so as to coincide one corner of said reduced reference light metering area with a corresponding corner of said standard light metering area one after another to detect a mean brightness value of said reduced reference light metering area shifted to each said corresponding corner of said standard light metering area, selecting one reduced reference light metering area having an extreme mean brightness value among said four-way shifted reduced reference light metering areas to determine it as another rectangular standard light metering area, and defining another rectangular reduced reference light metering area depending from said another standard light metering area; means for detecting a maximum brightness value of said respective standard light metering area;

mean brightness detecting means for detecting a mean brightness value of said respective reference standard light metering area;

means for comparing said difference of said mean brightness values of each two adjacent reference standard light metering areas with a determined or preselected value; and an exposure determining means for determining an exposure based on said mean brightness value of said another reference standard light metering area when said difference between said mean brightness values of said adjacent reference standard light metering areas converges said predetermined value.

7. A light metering device as defined in claim 6, wherein said extreme mean brightness value is the maximum mean brightness value among the four.

8. A light metering device as defined in claim 6, wherein said extreme mean brightness value is the minimum mean brightness value among the four.

9. A light metering device having a plurality of light detecting elements arranged in a matrix detect brightness of smaller divisions into which a whole image field is divided, respectively, said light metering device comprising:

means for defining a rectangular standard light metering area by selectively driving said light detecting elements contained in a corresponding rectangular area, defining a rectangular reference light metering area reduced in size depending from said standard light metering area, shifting said reduced reference light metering area in four ways so as to coincide one corner of said reduced reference light metering area with a corresponding corner of said standard light metering area one after another to detect a mean brightness value of said reduced reference light metering area shifted to each said corresponding corner of said standard light metering area, selecting one reduced reference light metering area having an extreme mean brightness value among said four-way shifted reduced reference light metering areas to determine it as another rectangular standard light metering area, and defining another rectangular reduced reference light metering area depending from said another standard light metering area; means for detecting a maximum brightness value of said respective standard light metering area;

means for comparing said difference of the maximum brightness values of said standard light metering areas and a maximum brightness value of a whole maximum light metering area corresponding a whole image field with a determined value; and exposure determining means for determining a proper exposure based on data of brightness of a smaller one of said standard light metering areas when said difference of said maximum brightness values of said standard light metering area relative to said maximum brightness value of a light metering area corresponding to said whole image field becomes larger than a predetermined brightness value.

* * * * *